United States Patent
Babinec et al.

(10) Patent No.: US 6,203,727 B1
(45) Date of Patent: Mar. 20, 2001

(54) ELECTRONICALLY-CONDUCTIVE POLYMERS

(75) Inventors: Susan J. Babinec; Ashish Sen; Ray E. Drumright, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/172,795

(22) Filed: Oct. 14, 1998

Related U.S. Application Data
(60) Provisional application No. 60/062,047, filed on Oct. 15, 1997.

(51) Int. Cl.$^7$ .................................................. H01B 1/12
(52) U.S. Cl. ........................................................ 252/500
(58) Field of Search ............................ 252/500; 528/210, 528/212, 422

(56) References Cited

U.S. PATENT DOCUMENTS

| | | | |
|---|---|---|---|
| 3,645,992 | 2/1972 | Elston | 260/80.78 |
| 3,933,734 | 1/1976 | Mark et al. | 260/45.75 |
| 4,188,475 | 2/1980 | Margotte | 528/175 |
| 4,195,156 | 3/1980 | Bruckdorfer | 528/171 |
| 4,285,855 | 8/1981 | Tokuda | 260/45.75 |
| 4,289,685 | 9/1981 | Druschke et al. | 260/45.75 |
| 4,910,645 | 3/1990 | Jonas et al. | 361/525 |
| 5,066,731 * | 11/1991 | Feldhues et al. | 525/417 |
| 5,069,820 | 12/1991 | Jen et al. | 252/500 |
| 5,160,457 | 11/1992 | Elsenbaumer | 252/500 |
| 5,232,631 | 8/1993 | Cao et al. | 252/500 |
| 5,272,236 | 12/1993 | Lai et al. | 526/348.5 |
| 5,278,241 | 1/1994 | Patil et al. | 525/274 |
| 5,281,363 * | 1/1994 | Shacklette et al. | 252/500 |
| 5,378,402 | 1/1995 | Cross et al. | 252/500 |
| 5,378,403 | 1/1995 | Shacklette | 252/500 |
| 5,378,404 | 1/1995 | Han et al. | 252/500 |
| 5,415,893 | 5/1995 | Wiersma et al. | 427/385.5 |
| 5,422,423 | 6/1995 | Shacklette et al. | 528/422 |
| 5,484,838 | 1/1996 | Helms et al. | 524/496 |
| 5,489,400 | 2/1996 | Liu | 252/500 |
| 5,540,862 | 7/1996 | Cao et al. | 252/500 |
| 5,618,469 | 4/1997 | Harlev et al. | 252/500 |
| 5,624,605 | 4/1997 | Cao et al. | 252/500 |
| 5,644,017 | 7/1997 | Drumright et al. | 528/196 |
| 5,674,968 | 10/1997 | Drumright et al. | 528/173 |
| 5,895,606 * | 4/1999 | Kudoh et al. | 252/500 |
| 5,911,918 * | 6/1999 | Shacklette et al. | 252/500 |

FOREIGN PATENT DOCUMENTS

| | | |
|---|---|---|
| 0340512 | 11/1989 | (EP) . |
| 0 409 124A | 1/1991 | (EP) . |
| 0582919 A2 | 2/1994 | (EP) . |
| 0 591 951 | 4/1994 | (EP) . |
| 0643397 A1 | 3/1995 | (EP) . |
| 0668594 A2 | 8/1995 | (EP) . |
| 0758671 | 2/1997 | (EP) . |
| 5-262981 | 10/1993 | (JP) . |
| 07165892 | 6/1995 | (JP) . |
| WO 95 18453 | 7/1995 | (WO) . |
| WO 97/03127 | 1/1997 | (WO) . |
| WO 97/07901 | 3/1997 | (WO) . |

OTHER PUBLICATIONS

Ohtani et al "Effective Doping of Polymer Anion during Chemical Polymeration . . ." Bull. Chom. Soc. Jpn. 62, 234–238, 1989 vol. 62, No. 1.*

Bayer Product Information Trial Product A1 4071 No Pub Info/ No Pub Date.

Chen et al., *Macromolecules*, "Structure and Properties of Poly(acrylic acid)—Doped Polyaniline", 28, pp. 2858–66, 1995.

Fu et al., *Macromol. Rapid Commun.*, "Protonation of polyaniline with lightly sulfonated polystyrene", 17, pp. 487–492, 1996.

Liao et al., *Polymers for Advanced Technologies*, "Doping of Polyaniline with Polymeric Dopants in Solid State, Gel State and Solutions", 6, pp. 47–51, 1995.

* cited by examiner

*Primary Examiner*—Mark Kopec

(57) ABSTRACT

A doped intrinsically-conductive polymer having a conductivity of at least about $10^{-12}$ Siemens/cm (S/cm); which is doped with at least two different dopants, including a "short-chain dopant" having a molecular weight of less than 1,000 and a "long-chain dopant" which is polymeric and has a weight average molecular weight of greater than 2,000.

9 Claims, No Drawings

ELECTRONICALLY-CONDUCTIVE POLYMERS

This application claims benefit of Provisional application Ser. No. 60/062,047 filed Oct. 15, 1997.

BACKGROUND OF THE INVENTION

This invention relates to electronically-conductive polymers, and to composite articles or polymer blends containing such polymers. More specifically, this invention relates to electronically-conductive polymers having both improved conductivity and processability, and to composite articles comprising these.

Intrinsically conductive polymer compositions (ICPs), such as conductive forms of polyaniline, which are relatively thermally stable may be used to produce a thermally stable processible composition containing the ICP and one or more thermoplastic, solution-processible or thermoset polymers. See e.g., U.S. Pat. No. 5,160,457. U.S. Pat. No. 5,232,631 describes a composition comprising polyaniline, a solvent or plasticizing liquid, and a protonic acid solute which has been functionalized so that the polyaniline:protonic acid combination is compatible with nonpolar or weakly-polar organic liquids or solutions, or molten or liquefied oligomers, polymers or polymer mixtures. However, while the combination of the doped polyanilines and polymers described in these patents are thermally and solution processible to some extent, a relatively high weight content of the doped polyaniline is required to achieve the required conductivity for certain applications, such as electrostatic painting applications. The physical properties of the blends may also be less than desirable for certain applications. For example, the high acid dopant content of such compositions is relatively corrosive to metal and is a safety hazard. Corrosivity is particularly detrimental in applications, wherein the electronically-conducting polymer composite is processed through metal equipment, or the composite contacts metal during use. EP Application 582,919 describes a method for lowering the polyaniline content of such a blend by adding a metal salt to the blend. However, the physical properties of such a blend, particularly its impact resistance at low temperatures, may be less than desirable for certain applications.

Complexes of polyaniline and dopants having a relatively high molecular weight are also known and described, for example, in U.S. Pat. No. 5,378,402. Such complexes have relatively high solubility in solvents and matrix polymers, but their conductivity may be less than desirable for certain applications. Conductive polymers doped with more than one dopant are known and are described, for example, in U.S. Pat. No. 5,378,404. Such polymers are prepared by partially un-doping an ICP solid particle doped with a first dopant, and then doping with the second dopant which is more compatible with a matrix polymer with which the conductive polymer is to be blended. However, the thermal stability and processing characteristics of the doped polymer may still be less than desirable.

SUMMARY OF THE INVENTION

The inventors have discovered that electronically-conductive polymers possessing excellent conductivity, thermal stability, and good compatibility with matrix polymers may be prepared by utilizing a combination of at least two dopants one having a relatively low molecular weight and one having a relatively high molecular weight. The polymers and composites of the invention may be used to prepare electrostatically-paintable plastic articles, electronically-conductive coatings, films, fibers, and other shaped articles for other applications wherein a semiconductive or conductive substrate is desirable, such as, for example, other electromotive coating processes, anti-static applications, electroactive applications such as corrosion prevention or sensors, and the production of conductive fillers, such as polyaniline-coated talc and other platelets. These and other advantages of the invention will be apparent from the description which follows.

In one aspect, this invention is a doped intrinsically-conductive polymer having a conductivity of at least about $10^{-12}$ Siemens/cm (S/cm). This ICP is doped with at least two different dopants, based on molecular weight, including a first dopant (hereafter, "short-chain dopant") having a molecular weight of less than about 1,000 and a second dopant (hereafter, "long-chain dopant") which is polymeric and has a weight average molecular weight of greater than about 2,000. (Note that for oligomeric and polymeric compounds all molecular weights are weight average molecular weight unless otherwise specified.) The short-chain dopant is present in an amount sufficient to increase the conductivity of the composition, relative to the conductivity of a composition which is the same in all respects except that the intrinsically-conductive polymer has the same molar amount of available sites doped solely with the long-chain dopant.

In a second aspect, this invention is a compatible mixture of: (i) a thermoplastic or thermosetting polymer, and (ii) the doped intrinsically-conductive polymer of the first aspect of the invention.

DETAILED DESCRIPTION OF THE INVENTION

The term "intrinsically-conductive polymer" or "ICP" as used herein refers to a polymer with extended pi-conjugated groups which may be rendered conductive with an acid or a redox agent to form a charge transfer complex with a conductivity of at least about $10^{-12}$ S/cm. The charge transfer may be full or partial, depending on the specific electron donor/electron acceptor pair. For example, partial charge transfer between certain lithium salts and polyaniline has been found to increase the conductivity of the polyaniline. Full charge transfer is believed to occur with polyaniline and protons, and polythiophene and protons or transition metals. The process of rendering the polymer electronically conductive is referred to herein as "doping". ICPs which have been rendered conductive and have not been rendered conductive are referred to herein as "doped" ICPs and "undoped" ICPs, respectively. The compounds and polymers which may be used in such doping processes to render the ICPs conductive are referred to herein as "dopants".

Examples of suitable ICPs include polyaniline, polyacetylene, poly-p-phenylene, polypyrrole, polythiophene, poly(phenylene sulfide), polyindole, derivatives thereof such as poly(3-alkylthiophene), polyethylene dioxythiophene and poly(o-methoxy aniline), copolymers, and mixtures thereof. When low cost and high temperature stability are important, the ICP is preferably a polyaniline, polypyrrole, or polythiophene, but is most preferably a polyaniline. However, if the ICP is used to prepare a composite with a thermoplastic or thermoset polymer, the choice of ICP may also depend on its compatibility with such polymer. For example, polypyrrole is especially compatible with polymers with which it can form hydrogen bonds along its backbone; polyalkyithiophenes are particularly compatible with polyolefins and polystyrene; and polyacetylene; are particularly compatible with polyolefins.

Polyaniline can occur in several different oxidative states such as leucoemeraldine, protoemeraldine, emeraldine, nigraniline, and pernigraniline, depending on the ratio of amine groups to imine groups present in the backbone of the polymer. In addition, each oxidative state may or may not be protonated. For example, the emeraldine salt form of polyaniline, in which about 50 percent of the nitrogen atoms are contained in imine groups, is a very conductive and stable form of a protonated polyaniline. The nonconductive base is blue in color, while the protonated form (emeraldine salt) is green.

The ICP may be doped by any suitable method. The effectiveness of the various doping methods and the conductivity of the doped ICP obtained thereby may vary depending on the doping method, the particular ICP, the particular dopant(s), (and the stage in a composite fabrication process at which the ICP is doped, if the ICP is used to prepare a composite). The ICP may be doped, for example, by mixing a solution, melt, or dispersion of the dopant(s) with the ICP either in solution or with the ICP in the solid state, contacting a solid ICP with solid dopant(s) (solid state doping), by contacting a solid ICP with dopant(s) in vapor form, or any combination of these.

The dopants are preferably utilized in a step-wise procedure, by doping the ICP with the long-chain dopant first, and then doping with the short-chain dopant. It is believed that the short-chain dopant is better able to migrate through the matrix of ICP and long-chain dopant to reach a site on the polymer available for doping, than is the long-chain dopant if the step-wise procedure were carried out in the reverse. A preferred method for doping the polymer with the long-chain dopant is by use of a template synthesis method for preparing the polyaniline, as described, for example, in U.S. Pat. No. 5,489,400 and in WO 97/03127. Such a method generally includes the steps of complexing the monomers used to prepare an ICP with the long-chain dopant in solution, and then adding an oxidant to the complex and polymerizing the complexed monomers to form the doped ICP complex. Such a process creates a polymeric complex composed of two strands, one strand being the conductive polymer and the other being an ionic-functional group-containing polymer (the long-chain dopant). The short-chain dopant is then added to the ICP doped with the long-chain dopant, to replace a portion of the long-chain dopant sites or to dope undoped sites on the polymer.

The polymers of the invention are doped with at least two "different" dopants having different molecular weights. Typically, the short-chain dopant will be a compound or monomer, containing a single doping site or moiety (e.g. dodecylbenzenesulfonic acid) or multiple doping moieties (e.g. naphthalene disulfonic acid). The long-chain dopant will be a polymer with preferably multiple doping sites. However, the short-chain dopant may be oligomeric or polymeric. Also, a polymerization reaction product may contain polymers of varying molecular weights. Therefore, as used herein, a polymeric long-chain dopant is "different" from a polymeric short-chain dopant if it is derived from a different monomer(s) than the first dopant, or if it was prepared in a polymerization reaction which is separate from the polymerization reaction to prepare the second dopant.

The amount of each dopant to be used in the preparation of the doped ICP and the composite will depend on several factors, including the desired conductivity of the ICP and/or the composite, the equivalent weight of the dopant(s), and the physical, thermal, and/or solution processing characteristics of the components of the composite and their compatibility with each other. Also, higher equivalent weight dopants tend to reduce the bulk conductivity of the doped ICP. In general, polyaniline will reach a maximum conductivity when the dopant is supplied in an amount sufficient to dope about 50 mole percent of the available sites. Other types of ICPs will typically reach a maximum conductivity at a somewhat lower level of doping such as, for example, about 30 mole percent of the available sites for polypyrroles and polythiophenes. The molar amount of dopant necessary to reach the maximum conductivity for the ICP will depend on: (1) the particular ICP utilized, (2) its chemical purity, and (3) the physical distribution of the dopant within the ICP matrix. Preferably, the amount of dopant utilized does not greatly exceed the amount which is needed to dope the polymer for cost reasons, and because the excess dopant may have a tendency to leach out of the composite containing the doped polymer and excess dopant.

Examples of suitable dopants for polyaniline and other ICPs include any salt, compound, or polymer capable of introducing a charged site on the polymer, including both partial- and full-charge transfer such as, Lewis acids, Lowry-Brønsted acids, and certain alkali metal salts such as lithium tetrafluoroborate, and transition metal salts such as salts of gold, iron, copper, and platinum; and other redox agents having a sufficiently oxidizing oxidative couple to dope the polymer; alkyl or aryl halides; and acid anhydrides. Not all of the dopants listed above will dope each type of ICP; however, appropriate dopants for the ICPs listed above are known in the art or may be readily determined experimentally.

Examples of dopants which are suitable as the short-chain dopant include low molecular weight alkylation agents such as those corresponding to the formula R-X, wherein R is a $C_{1-20}$ hydrocarbyl group containing one or more alkyl, aryl, or benzyl substituents, and X is Cl, Br, or I. Examples of alkylation agents include methyl iodide and benzyl bromide. Examples of suitable acid anhydrides include maleic anhydride, phthalic anhydride, and acetic anhydride.

Examples of suitable Lewis acids and Lowry-Brønsted acids that may be used as dopants include those described in U.S. Pat. No. 5,160,457, the "functionalized protonic acids" described in U.S. Pat. No. 5,232,631 and the "polymeric dopants" described in U.S. Pat. No. 5,378,402, all of which are hereby incorporated by reference. Specific examples of such acids include dodecylbenzenesulfonic acid, toluenesulfonic acid, hydroxybenzenesulfonic acid (HBSA), hydrogen chloride, sulfuric acid, nitric acid, $HClO_4$, $HBF_4$, $HPF_6$, HF, phosphoric acids, picric acid, m-nitrobenzoic acids, dichloroacetic acid, selenic acid, boronic acid, organic sulfonic acids, and inorganic clusters of polyoxometallates. Most preferably, the short-chain dopant is dodecylbenzenesulfonic acid, toluenesulfonic acid, or HBSA. In addition, mixtures of the above may be used as the short-chain dopant.

Examples of polymeric dopants include polymers having terminal or pendant carbon-, phosphorous-, or sulfur-containing acid groups, and salts and esters thereof, or mixtures thereof. Specific examples include ethylene/acrylic acid copolymers, polyacrylic acids, ethylene/methacrylic acid copolymers, carboxylic acid- or sulfonic acid-functional polystyrene, polyalkylene oxides, and polyesters; and graft copolymers of polyethylene or polypropylene and acrylic acid or maleic anhydride as well as mixtures thereof; sulfonated polycarbonates, sulfonated ethylene-propylene-diene terpolymers (EPDM), sulfonated ethylene-styrene copolymers, polyvinylsulfonic acid, sulfonated poly (phenylene oxide), and sulfonated polyesters such as poly-ethylene terephthalate; as well as the certain alkali metal and transition metal salts of such acids, preferably the lithium, manganese, and zinc salts of such acids.

Sulfonated polycarbonates may be prepared, for example, by the methods described in U.S. Pat. Nos. 5,644,017 and 5,674,968.

Examples of suitable high molecular weight alkylation agents include those corresponding to the formula $R^1$-X, wherein $R^1$ is polystyrene, poly(ethylene-styrene), and X is Cl, Br, or I. Examples include halomethylated polystyrene or poly(ethylene-styrene), and brominated copolymer of paramethylstyrene and isobutylene (available from Exxon as ExxPro). Examples of high molecular weight acid anhydrides such as an alternating copolymer of maleic anhydride and 1-octadecene (available from Aldrich Chemical), copolymers of maleic anhydride and styrene, and maleic anhydride-grafted polymers such as polyethylene-grafted maleic anhydride. In addition, mixtures of the types of polymers described above may be used as the long-chain dopant.

The doped ICPs of the invention are doped with at least two different dopants having different molecular weights. The short-chain dopant may be in the form of a compound or a low molecular weight oligomer. If the short-chain dopant is a compound, its "molecular weight" is the molecular weight of a single species. If the short-chain dopant is an oligomer "molecular weight" refers to the weight-average molecular weight of the oligomers that are utilized for doping. The term "equivalent weight" as used herein refers to the number of grams of dopant per mole of reactive sites—e.g., if a compound has two doping sites the equivalent weight is one half of the molecular weight. As further example, if the dopant is an acid, the equivalent weight of the dopant would be expressed as the number of grams of polymer per mole of acid functionality.

The optimal choice of dopants (and the optimum reactive proportions in which they are utilized) for a particular ICP will depend on the desired physical properties of the resulting doped ICP for the particular application for which the ICP will be thereafter utilized. The electronic conductivity (and compatibility with other components of a composite, if prepared), achieved with a particular dopant acid will depend on the chemical composition and molecular weight of the dopant. If the ICP is used to prepare a composite, the long-chain dopants are preferably miscible or compatible with the host matrix. Dopants having high molecular weights tend to produce ICPs having excellent solubility and dispersibility in a solvent or host matrix, as may be observed visually, by light scattering, or by Transmission Electron Microscopy (TEM) analysis, if the ICP is dispersed in a solid. However, ICPs prepared using high molecular weight dopants also tend to have relatively low conductivity. Conversely, dopants having a lower molecular weight, such as para-toluenesulfonic acid (PTSA) or dodecylbenzenesulfonic acid (DBSA), tend to produce complexes having good conductivity, although the doped polymer may be less compatible with other polymers present in a composite, resulting in a relatively lower overall conductivity for the composite. If a composite of the ICP and polyethylene is prepared, the long-chain dopant is preferably an acid-functional polyethylene such as ethylene acrylic acid copolymer. If the thermoplastic polymer host matrix is a polycarbonate, the long-chain dopant is preferably a polycarbonate ionomer having terminal or pendant sulfonate groups or lightly-sulfonated polystyrene.

The short-chain dopants and long-chain dopants are selected in order to result in an increase in conductivity of the polymer, relative to a polymer having the same molar amount of available sites doped solely with the long-chain dopant. Preferably, the increase in conductivity is at least 100X, more preferably at least 1000X, most preferably at least 10,000X. Preferably, the molecular weight of the short-chain dopant differs from the weight-average molecular weight of the long-chain dopant by at least 2,000, more preferably at least 3,000, most preferably at least 4,000. The molecular weight of the short-chain dopant is preferably no greater than 600, more preferably no greater than 500. The weight average molecular weight of the long-chain dopant is preferably at least 5,000, more preferably at least 10,000.

The optimum ratio of long-chain to short-chain dopants used in the preparation of a doped ICP will depend on the factors mentioned above for choice of the particular dopants for a particular application. However, the choice of dopant ratio will particularly affect the conductivity and compatibility (surface tension, Hanson solubility parameter, etc.) of the doped ICP. Typically, the short-chain dopant is selected to enhance the conductivity of the doped ICP, and the long-chain dopant is selected to enhance the doped ICP's solubility in a solvent or polymer matrix. The ratio of dopants for the ICPs of the first aspect of the invention is selected to achieve a benefit by the use of a dual-doped system, relative to the singular use of short-chain or long-chain dopants. For example, optimum ratios of long-chain:short-chain dopants for an EAA:DBSA (ethylene acrylic acid copolymer:dodecylbenzenesulfonic acid) system to be blended into polyolefins differ from the ratios required for sulfonic acid end-capped polycarbonate:DBSA used to compatibilize polyaniline blends in polystyrene, polycarbonate, poly(methyl methacrylate), and poly(vinyl chloride). However, the optimum ratios may be readily determined experimentally by preparing samples of doped ICPs having different ratios of long-chain dopants, as illustrated by the examples which follow. Each dopant is preferably the dopant for at least 1 percent of the sites available for doping on the conductive polymer, more preferably at least 5 percent.

The doped ICP preferably has a conductivity of at least about $10^{-12}$ S/cm, more preferably at least about $10^{-6}$ S/cm, and most preferably at least about 1 S/cm.

Polymers useful as component (i) of the composites of the invention are referred to hereafter as "matrix" polymers, even though they may comprise substantially less than 50 percent of the polymers present in the composition.

Suitable thermoplastic polymers for use as the matrix polymer in the preparation of the composites of the invention preferably have a glass transition temperature of at least −100° C., most preferably at least −50° C.; but is preferably no greater than 300° C., more preferably no greater than 250° C. Examples of such polymers include polyolefin polymers and copolymers such as polypropylene, polyethylenes, poly(4-methylpentene), and poly(ethylene-vinyl acetate); styrenic polymers and copolymers such as polystyrene, syndiotactic polystyrene, poly(styrene-acrylonitrile) and poly(styrene-maleic anhydride); polysulfones; polyethersulfones; poly(vinyl chloride); aliphatic or aromatic polyesters such as poly(ethylene terephthalate) or poly(butylene terephthalate); aromatic or aliphatic polyamides such as nylon 6, nylon 6, 6 and nylon 12; polyacetal;

polycarbonate; thermoplastic polyurethanes; modified polyphenylene oxide; polyhydroxy ethers; polyphenylene sulfide; poly(ether ketones); poly(methyl methacrylate); aliphatic polyketones (such as copolymers of α-olefins and carbon monoxide sold by Shell under the trademark Carilon™) as well as mixtures thereof. Suitable polyolefins also include high and low density polyethylenes (including copolymers of ethylene and α-olefins such as butene, octene, hexene, and styrene) and polypropylene, linear low density polyethylene and polypropylene, and homogeneous random partly-crystalline ethylene-α-olefin copolymers having a narrow molecular weight distribution, as described by Elston in U.S. Pat. No. 3,645,992, and elastic substantially linear olefin polymers (available from The Dow Chemical Company as Affinity polyolefins and from Dow DuPont Elastomers as Engage™ polyolefins), as disclosed, for example, by Lai et al. in U.S. Pat. No. 5,272,236. Such polymers have a homogeneity index of at least 75 as determined by the following equation:

$$HI = 100 \frac{130 - 7.42(CH_3) + 0.414(CH_3)^2 - MP_{TC}}{11.09 CH_3 - 0.553(CH_3)^2}$$

wherein HI=homogeneity index, $CH_3$=Total $CH_3$/100C+vinyl/100C, and MPTC=melting point of the copolymer, °C.

The thermoplastic polymer may also be a physical blend of the above-mentioned polymers. For example, it can take the form of an impact-modified polymer containing a discrete rubbery phase dispersed within the thermoplastic polymer itself. An example of the latter is a material commonly referred to as a "thermoplastic polyolefin" (TPO), which is a blend of polypropylene and ethylene-propylene (EPR), ethylene-propylene-diene (EPDM), or ethylene octene rubbers commonly used in automotive applications. Other examples include poly(styrene-acrylonitrile) copolymer modified with polybutadiene rubber, commonly referred to as ABS, which is frequently used in automotive applications, and blends of ABS and other polymers, such as polycarbonate. Examples of suitable thermosetting polymers include, but are not limited to, polyurethane, polyepoxide, polyester, and vinyl ester resins. In addition, the matrix polymer may contain additive materials such as antioxidants, UV stabilizers, plasticizers, mineral fillers, mold release agents, or a combination of such additives.

The matrix polymer should possess a molecular weight high enough to impart physical properties to the composite that are desired for the particular processing requirements and end-use application. For example, for automotive applications, the polymer should be selected to provide sufficient tensile and impact strength over a range of temperatures, heat and chemical resistance, elongation, and stiffness. The relationship between polymer molecular weight and resulting physical properties varies with the class of polymers considered, however, thermoplastic polymers with molecular weights in excess of about 30,000 typically afford molded or fabricated articles with these desirable property attributes. In addition, the thermoplastic matrix polymer preferably possesses sufficient thermal stability to permit the use of melt fabrication as a means of preparing the blend with the doped ICP. Most of the above-mentioned thermoplastic polymers which are commercially available can be melt processed at temperatures where the amount of polymer degradation, if any, is not sufficient to substantially affect the polymer's physical properties.

In addition to the matrix polymer and ICP, the composite may additionally comprise other materials, such as, conductive fillers such as carbon, graphite, and metallic fibers or whiskers, as well as non-conductive fillers, pigments, surfactants, plasticizers, mold release agents, antioxidants, and UV stabilizers. Preferably, the matrix polymer of the composite is present in an amount, based on the weight of the composite, of at least about 75 percent, more preferably at least 80 percent, and most preferably at least about 90 percent.

Preferably, the thermoplastic polymer is present in an amount, based on the weight of the composite, of at least about 80 percent, more preferably at least about 90 percent, and most preferably at least about 98 percent.

The composites of the invention may be prepared, either by blending the doped ICP with the matrix polymer, or by polymerizing the matrix polymer in situ from a dispersion of the corresponding monomer in the doped ICP. Alternatively, the monomeric form of the ICP may be dissolved or dispersed in the matrix polymer and the ICP polymerized in situ in the presence of dopants, or both the ICP and the matrix polymer may be polymerized simultaneously in situ in the presence of dopants. In another embodiment of the invention, a graft-copolymer of a thermoplastic polymer and nitrogen-containing compound may be utilized as the matrix polymer. An example of a method for preparing such a copolymer is illustrated in U.S. Pat. No. 5,278,241.

The doped ICP is preferably present in an amount, based on the weight of the composite, of at least about 0.1 percent; but no more than about 25 percent, more preferably no more than about 20 percent, and most preferably no more than about 10 percent. However, if a high molecular weight dopant is utilized, a greater amount of doped ICP may be necessary to provide a desired conductivity, since the undoped ICP would represent a proportionately smaller part of that component. Similarly, if the doped ICP is prepared as a graft copolymer of an ICP and an insulating polymer, a greater amount of that component may be necessary to provide a desired conductivity, since the conductive portion of the polymer would be proportionately smaller.

The polymers of the composite and the long-chain dopants are preferably chosen to optimize the compatibility of the composite, in order to minimize the amount of the ICP which is necessary to achieve a particular conductivity. The term "compatible" as used herein refers to the tendency of the composite to not undergo gross phase separation or ICP particle aggregation from the time it is fabricated into an article, up until the conductive properties of the article are utilized, but also refers to the ability of the composite components to not significantly degrade each other's physical or conductive properties. For example, polypyrrole is especially compatible with polymers with which it can form hydrogen bonds along the backbone.

The amount of ICP which is necessary to provide a certain conductivity for a composite will depend, in part, on the size and shape of the ICP solids. Since conductive solids tend to agglomerate, the goal of compatibilization between the ICP and a matrix polymer is to prevent excessive agglomeration, by the introduction of favorable chemical and physical interactions between the two phases during mixing and chemical and thermal processing, and thereby drop the volume percent needed to reach the percolation threshold. However, a minor degree of agglomeration of the solids will improve the conductivity of the blend, relative to a completely uniform dispersion of ICP solids, since agglomerating solids will often first form conductive chains throughout the matrix (which may be referred to as a "chaining" effect). Accordingly, blends which utilize the least amount of ICP but achieve the highest conductivity, could be characterized as exhibiting both a chaining effect and chemical compatibility sufficient to prevent further agglomerization of the ICP particles after a chaining effect is achieved. Compatibilization may also be attained by preparing an interpenetrating network of the matrix polymer and ICP.

Compatibilization may also be described at a more microscopic level, based on the size of the domains in a composite, rather than solely on the bulk conductivity. Estimates of the chemical interactions between the two phases may be determined by reference to the solvent characteristics of the polymers, or by dissolving a small amount of the insulating matrix in solution, adding a given amount of conductive complex to the solution, mixing the two together, and then casting a film of the two from this solution. The rate of solvent evaporation and thus of film formation is controlled to produce a fairly smooth and uniform film. The degree of compatibilization can be observed with the naked eye and under a light microscope, since films which appear to contain large aggregates of ICPs surrounded by insulating host polymer are also typically found to be nonconductive when resistance is measured by a standard lab multimeter, which can measure up to 20 Mohm of resistance. In general, composites which are uniform to the eye are very frequently conductive, although in some cases the conductivity is enhanced at one side of the film vs. the other. In such cases, the aggregation and dispersion of the ICP in the host matrix can be studied more closely utilizing TEM techniques.

In general, the lower the weight percentage of an ICP needed in the blend for a target conductivity, the more compatible are the ICP and the matrix polymer. Accordingly, a convenient test for compatibility of a particular ICP/matrix polymer blend, relative to other such blends, is to define a desired minimum conductivity level, and then to determine the minimum amount of conductive additive which can be added to the host insulating matrix to achieve the desired conductivity.

The conducting composites described above may be prepared by any suitable method for preparing a uniform mixture of the matrix polymer and the doped ICP. For example, such mixture may be prepared by adding a doped ICP to the matrix polymer and then blending the two in a suitable solvent, by melt-processing the polymer components together at temperatures above the glass transition temperatures of the melting point of one of the polymers. It may also be more convenient in some cases to prepare the composite by first preparing a blend or master batch having a relatively high concentration of the doped ICP, which may then be mixed with pellets of the matrix polymer. The final polymer composite would thereafter be prepared at the point at which the pellet mixture is thermally processed and used to manufacture the end-use article. Mixtures containing thermoset polymers may be prepared by incorporating the doped polymers into any component of a multi-component thermoset system.

When combining doped ICPs of this invention with the matrix polymer to form the composite, an additional compatibilizing agent or agents may be utilized to further improve the compatibility and/or blending characteristics of the polymers in order to produce a uniform blend of a conductive material which has the most cost-effective amount of ICP necessary to achieve a particular conductivity, and which also has suitable physical properties, such as Young's modulus and impact properties.

The conductivity of the composites described herein is preferably at least about $10^{-12}$ S/cm, more preferably at least about $10^{-8}$ S/cm, and most preferably at least about $10^{-5}$ S/cm. However, the most preferred conductivity for a particular composite will, of course, depend on the particular application in which such composite is employed, as well as the cost and physical property requirements of the composite. For example, electrodeposition coating and electroplating processes may require a higher conductivity (such as $10^{-3}$ S/cm to 100 S/cm) than electrostatic coating processes. The conductivity of the composite directly affects the coating thickness and uniformity obtainable in an electromotive coating process, as well as the efficiency of the process, under a given set of coating process conditions. Once a "target" conductivity for a particular coating process is identified, the degree of "improvement" in conductivity for a matrix polymer which is necessary to achieve the target conductivity will depend on its inherent electronic conductivity, since some polymers are naturally more insulating than others. Many polymers commonly used commercially in structural applications have conductivities of less than $10^{-14}$ S/cm. The specific conductivity values given herein are intended to represent the local conductivity of the composite at the point at which it is measured, unless otherwise noted, since the conductivity of the composite may not be completely uniform across the entire sample.

The doped ICP is preferably employed in an amount sufficient to increase the electronic conductivity of a composition which is the same in all respects except that it does not contain the doped ICP, by at least a factor of 10, in S/cm. The ICP is preferably used in an amount sufficient to increase the average conductivity of the composite by a factor of $10^4$, and most preferably by a factor of $10^8$, relative to the same composite prepared in the absence of the semiconducting polymer. Of course, it is necessary for the doped intrinsically-conductive polymer to be more electronically conductive than the matrix polymer for this to occur, but the polymer may inherently possess some degree of electronic conductivity by itself, as discussed above, or the composite may contain other conductive fillers, such as carbon particles or fibers.

The composites of the invention may possess advantageous physical properties, such as tensile strength, elongation, room temperature impact strength, and/or low temperature strength, relative to other plastic materials having substances incorporated therein in amounts sufficient to increase their conductivity, particularly for a given target conductivity above about $10^{-5}$ S/cm. Low temperature impact resistance of a material may be determined using ASTM Method No. D-3763-86 (1995) carried out on a Dynatup™ impact testing machine (Model No. 8000, available from GRC International. Vienna, Va.) at a temperature of about −29° C. Tensile strength properties of the composites may be tested according to ASTM Method No. D-6388-76 (1988).

Further, the doped ICPs of the invention may be used to prepare water or organic solvent-based coatings. Such coatings are particularly useful for preventing corrosion to metal, such as for coating metal substrates used in aerospace, automotive, and marine applications. Examples of organic solvents include toluene, methyl ethyl ketone, tetrahydrofuran, $C_{1-24}$ alcohols, methylene chloride, methyl sulfoxide, and N,N-dimethylformamide. The doped ICP is preferably utilized in an amount, based on the weight of the coating, in the range of from 0.01 percent to 95 percent.

Illustrative Embodiments

The following examples are given to illustrate the invention and should not be interpreted as limiting it in any way. Unless stated otherwise, all parts and percentages are given by weight.

EXAMPLE 1
Preparation of Polyaniline Doped with Sulfonated Polycarbonate
Preparation of Sulfonated Polycarbonate (referred to as PC-acid)

A 12 L, 4-necked flask equipped with condenser, mechanical stirrer, thermometer, and gas inlet tube was charged with 25.9 g (0.117 mol) of 4-chlorosulfonyl benzoic acid and 507 mL (6.27 mol) of pyridine. After stirring for 30 minutes under a nitrogen atmosphere, 5 L of methylene chloride and 536.5 g (2.35 mol) of bisphenol A was added. Gaseous phosgene was then added to the flask until an aliquot of the reaction mixture indicated a positive endpoint with 0.1 percent 4-(4-nitrobenzyl)pyridine in tetrahydrofuran. A total of 235.7 g (2.38 mol) of phosgene was needed. Excess phosgene was consumed by the addition of 5 mL of methanol.

The reaction mixture was then stirred with 1 L of water for 60 minutes. Next, 250 mL of concentrated HCl was added and the reaction mixture was stirred for 30 minutes to remove pyridine. The layers were separated and then the methylene chloride layer was washed with 0.6 HCl. If desired, the pyridinium salt of the ionomer can be isolated at this stage by precipitation. By proton NMR, the degree of polymerization of the polymer (pyridinium salt) was 40 and its inherent viscosity was 0.324 dL/g in methylene chloride at a concentration of 0.5 g/dL. Proton NMR confirmed the presence of terminal sulfonic acid groups neutralized as the pyridinium salt.

Tetrahydrofuran (600 mL) was added to the methylene chloride solution of the ionomer (pyridinium salt) and the polymer solution was passed down a column of 500 mL of a strong acid cation exchange resin (in the acid form). This operation removed residual pyridine and converted the ionomer from the pyridinium salt to the free sulfonic acid. The free sulfonic acid was isolated by precipitation. The average equivalent weight of the ionomer may be con trolled by the ratio of 4-chloro-sulfonyl benzoic acid to bisphenol A.
Preparation of Polyaniline Doped with Sulfonated Polycarbonate Samples of end-capped sulfonated polycarbonates having average acid equivalent weights of 3,250 and 8,500, respectively, were combined with separate samples of neutral (blue color) polyaniline (neutralized Versicon® polyaniline, obtained from AlliedSignal) and 3 weight percent PEPQ antioxidant in methylene chloride, and sonicated at 50° C. for three days and then evaporated in an open dish to yield a green, clear film. The conductivity of the film (for all of the examples herein) was estimated by measuring surface resistance with a multimeter which had a maximum measurable resistance of $10^7$ ohms. The approximate spacing between electrodes was 1 cm. Razor blades were used to electrically contact samples for all conductivity measurements; application of a small amount of pressure allowed measurement of conductivity below the film's surface (underneath the potentially insulating surface skin). The material was found to have >$10^7$ ohms resistance by this technique. Although the exact resistivity of the samples could not be measured using this particular multimeter, the color change of the polyaniline from blue to green indicated that the sulfonated polycarbonates had doped the polyaniline and increased its conductivity relative to the initial undoped blue state.

EXAMPLE 2
Preparation of Polyaniline Doped with Sulfonated Polycarbonate and DBSA Sulfonated polycarbonate polymers having equivalent weights of 3,250 or 8,500 were prepared as described in Example 1 and were combined with DBSA in the mole ratios described below. For this, 1.0 g undoped polyaniline (11 mmoles of aniline repeat units), 0.24 g PEPQ antioxidant, the two acids (PC-acid and DBSA), and 200 g methylene chloride were combined in a bottle, sparged with $N_2$ for 10 minutes, sealed with an air-tight cap, and then sonicated for 2 days at 50° C. After this, the solutions were poured into evaporating dishes and the solvent allowed to evaporate at room temperature and pressure. The solids so obtained were pressed into pellets at room temperature. The conductivity of the pellet was obtained by measuring the resistance through the thickness of the pellet, with a multimeter, and the thickness was measured to within 0.05 cm with a Vernier caliper. A piece of Grafoil™ graphite foil (available from UCAR Carbon Company, Inc., Bay City, Mich.) was pressed against each face of the pellet in order to maximize contact across the face of the pellet, and minimize contact resistance in the measurement. If the Grafoil™ graphite foil was not used, resistance values were consistently larger. The conductivities are expressed in $ohm^{-1}cm^{-1}$ or S/cm. The data reported in Tables 1 and 2 shows examples wherein the mole ratio of polyaniline:sulfonated polycarbonate was constant and the amount of DBSA varief as indicated. Table 3 shows examples wherein the molar ratio of acid:polyaniline groups was kept constant but the amounts of each type of acid were varied.

TABLE 1

| | 3250 EQUIVALENT WEIGHT PC-ACID | | | | |
|---|---|---|---|---|---|
| Sample | PC-acid (gram) | DBSA (gram) | Mole Ratio Polyaniline:- $Acid_{total}$ | Mole Ratio Polyaniline:DBSA | Cond. (S/cm) |
| A | 6 | 1.3 | 1:0.5 | 1:0.33 | $4.8 \times 10^{-3}$ |
| B | 6 | 2.4 | 1:0.8 | 1:0.63 | $2.3 \times 10^{-2}$ |
| C | 6 | 3.4 | 1:1.05 | 1:0.88 | $1.7 \times 10^{-2}$ |
| D | 6 | 4.4 | 1:1.24 | 1:1.08 | $2.5 \times 10^{-2}$ |
| E | 6 | 0 | — | — | OL |

All of the above compositions were soluble in methylene chloride.

TABLE 2

8500 EQUIVALENT WEIGHT PC-ACID

| Sample | PC-acid (gram) | DBSA (gram) | Mole Ratio Polyaniline:-Acid$_{total}$ | Mole Ratio Polyaniline:DBSA | Cond. (S/cm) |
|---|---|---|---|---|---|
| F | 6 | 1.6 | 1:0.5 | 1:0.36 | $6.8 \times 10^{-3}$ |
| G | 6 | 2.6 | 1:0.8 | 1:0.59 | $6.8 \times 10^{-3}$ |
| H | 6 | 3.5 | 1:1.05 | 1:0.79 | 0.14 |
| I | 6 | 4.4 | 1:1.3 | 1:0.99 | 0.22 |
| J | 6 | 0 | — | — | OL |

All of the above compositions were soluble in methylene chloride.

"OL" as used herein means overload and was a conductivity of less than about $10^{-8}$ S/cm in this configuration. The data in Tables 1 and 2 shows that the use of a low molecular weight dopant (DBSA) and a high molecular weight dopant (PC-Acid) gives high conductivity and solubility in methylene chloride. The use of only a high molecular weight PC-acid dopant gave a polyaniline complex which was methylene chloride soluble, but not conductive. The use of only DBSA as a dopant (not shown in Tables) gave a polyaniline complex which was very conductive, but not soluble in methylene chloride. Likewise, the data in Tables 1 and 2 shows that conductivity increased as the relative amount of DBSA increased.

The data in Table 3 shows that when the number of acid doping sites was held constant the conductivity nevertheless changes with the molecular weight of the dopants. Samples having more short-chain dopant generally had higher conductivity.

TABLE 3

3250 EQUIVALENT WEIGHT PERCENT ACID; POLYANILINE:ACID TOTAL = 1:1; VARIABLE RATIO PC-ACID:DBSA

| Sample | Mole Ratio PC-acid:DBSA | PC-acid (gram) | DBSA (gram) | Cond. (S/cm) |
|---|---|---|---|---|
| K | 1:0.2 | 28.8 | 0.6 | $2.1 \times 10^{-6}$ |
| L | 1:0.5 | 23 | 1.2 | $1.6 \times 10^{-4}$ |

TABLE 3-continued

3250 EQUIVALENT WEIGHT PERCENT ACID; POLYANILINE:ACID TOTAL = 1:1; VARIABLE RATIO PC-ACID:DBSA

| Sample | Mole Ratio PC-acid:DBSA | PC-acid (gram) | DBSA (gram) | Cond. (S/cm) |
|---|---|---|---|---|
| M | 1:1 | 17.3 | 1.7 | $3.9 \times 10^{-4}$ |
| N | 1:2 | 11.5 | 2.3 | $1.1 \times 10^{-2}$ |
| P | 1:3 | 8.6 | 2.6 | $7.9 \times 10^{-3}$ |
| Q | 1:4 | 6.9 | 2.8 | $1.1 \times 10^{-2}$ |
| R | 1:9 | 3.5 | 3.2 | $6.6 \times 10^{-2}$ |
| S | 1:20 | 1.6 | 3.4 | $6.6 \times 10^{-2}$ |

The doped ICP and a matrix polymer (either polycarbonate or polystyrene as designated in the following Tables 4–8) were dissolved in methylene chloride, stirred and film cast. The solvent was evaporated at room temperature. The weight percentage of doped polyaniline based on weight of matrix polymer was varied as shown in the Tables 4–8. Surface resistance was measured using a multimeter with both probes on the same side of the sample at a spacing of about 1 cm. The data in these tables demonstrates that the conductivity of a composition containing the ICP was effected by the compatibility of the ICP with the matrix polymer. The data in Table 8 also shows that different ratios were effective for different matrix polymers.

TABLE 4

SURFACE RESISTANCE OF BLENDS IN POLYCARBONATE OF DUAL DOPANT SYSTEM USING 3250 EQUIVALENT WEIGHT PC-ACID

| | | Resistance (ohms) | | | |
|---|---|---|---|---|---|
| Sample | Sample used to make blend | 2 weight % of ICP | 5 weight % of ICP | 10 weight % of ICP | 15 weight % of ICP |
| A-1 | A | >$10^7$ | >$10^7$ | $3 \times 10^3$ | — |
| B-1 | B | $13.6 \times 10^6$ | $26 \times 10^6$ | $65 \times 10^3$ | $3 \times 10^3$ |
| C-1 | C | $110 \times 10^3$ | $500 \times 10^3$ | $7.3 \times 10^3$ | $2.5 \times 10^3$ |
| D-1 | D | $4.5 \times 10^6$ | $800 \times 10^3$ | $5.9 \times 10^3$ | $4.5 \times 10^3$ |

TABLE 5

SURFACE RESISTANCE OF BLENDS IN POLYSTYRENE OF DUAL DOPANT SYSTEM USING 3250 EQUIVALENT WEIGHT PC-ACID

| | | Resistance (ohms) | | | |
|---|---|---|---|---|---|
| Sample | Sample used to make blend | 2 weight % of ICP | 5 weight % of ICP | 10 weight % of ICP | 15 weight % of ICP |
| A-2 | A | >$10^7$ | >$10^7$ | — | — |
| B-2 | B | $5.2 \times 10^6$ | $4.7 \times 10^6$ | $14.5 \times 10^3$ | $700 \times 10^3$ |
| C-2 | C | $1.2 \times 10^6$ | $50 \times 10^3$ | $7.5 \times 10^3$ | $2.3 \times 10^3$ |
| D-2 | D | — | $400 \times 10^3$ | $11 \times 10^3$ | $4 \times 10^3$ |

TABLE 6

SURFACE RESISTANCE OF BLENDS IN POLYCARBONATE OF DUAL DOPANT SYSTEM USING 8500 EQUIVALENT WEIGHT PC-ACID

| | | Resistance (ohms) | |
|---|---|---|---|
| Sample | Sample used to make blend | 2 weight % of ICP | 5 weight % of ICP |
| F-1 | F | >$10^7$ | >$10^7$ |
| G-1 | G | >$10^7$ | >$10^7$ |
| H-1 | H | >$10^7$ | $20 \times 10^6$ |
| I-1 | I | >$10^7$ | $200 \times 10^3$ |

TABLE 7

SURFACE RESISTANCE OF BLENDS IN POLYSTYRENE OF DUAL DOPANT SYSTEM USING 8500 EQUIVALENT WEIGHT PC-ACID

| | | Resistance (ohms) | |
|---|---|---|---|
| Sample | Sample used to make blend | 2 weight % of ICP | 5 weight % of ICP |
| F-2 | F | >$10^7$ | >$10^7$ |
| G-2 | G | >$10^7$ | >$10^7$ |
| H-2 | H | >$10^7$ | $20 \times 10^6$ |
| I-2 | I | >$10^7$ | $200 \times 10^3$ |

TABLE 8

SURFACE RESISTANCE OF BLENDS OF DUAL DOPED POLYANILINE USING 3250 EQUIVALENT WEIGHT PC-ACID, IN SEVERAL POLYMERS

| | "SURFACE RESISTANCE in ohms" AT 2.5 weight % of doped ICP based on total weight of sample | | | |
|---|---|---|---|---|
| Ratio loading in PC-acid:DBSA | Poly(vinyl chloride) | Poly(methyl methacrylate) | Polystyrene | Poly-carbonate |
| 1:9 | $10 \times 10^6$ | $500 \times 10^3$ | $20 \times 10^6$ | $20 \times 10^6$ |
| 1:20 | $28 \times 10^6$ | $500 \times 10^3$ | $50 \times 10^3$ | $4 \times 10^6$ |

EXAMPLE 3

The polyaniline complexes described in Tables 9 and 10 were prepared by combining the proper amounts of the acid dopants EAA (Ethylene Acrylic Acids of variable acrylic acid content (mole percent AA), obtained from Scientific Polymer Products Inc.) and DBSA with undoped polyaniline, 2 weight percent of antioxidant PEPQ, and 200 g of toluene. The solution was sparged with $N_2$, sealed in a bottle with an air-tight cap, and sonicated for 2 days at about 40° C.

Solid polyaniline complex was obtained by evaporation of the solvent at room temperature. The conductivity was measured on a pressed pellet, and measured for conductivity using a 2 kg load. A piece of Grafoil™ graphite foil was pressed against each face of the pellet in order to maximize contact cross the face of the pellet, and minimize contact resistance in the measurement. These values are reported in Table 9.

TABLE 9

CONDUCTIVITY OF EAA/DBSA DUAL DOPED POLYANILINE

| Mole Ratio EAA: DBSA 1:1 N: total H Ratio | Conductivity of Complex (S/cm) | | | |
|---|---|---|---|---|
| | 5% AA in EAA | 10% AA in EAA | 15% AA in EAA | 20% AA in EAA |
| 1:0.2 | $7 \times 10^{-6}$ | $9 \times 10^{-4}$ | $3 \times 10^{-3}$ | $9 \times 10^{-2}$ |
| 1:0.5 | — | $1 \times 10^{-5}$ | $3 \times 10^{-2}$ | $2 \times 10^{-1}$ |
| 1:1 | $1 \times 10^{-3}$ | $3 \times 10^{-2}$ | $6 \times 10^{-2}$ | $1 \times 10^{-1}$ |
| 1:2 | $6 \times 10^{-4}$ | $3 \times 10{-2}$ | $8 \times 10^{-2}$ | $2 \times 10^{-1}$ |
| 1:3 | $3 \times 10^{-2}$ | $3 \times 10^{-2}$ | $1 \times 10^{-1}$ | $2 \times 10^{-1}$ |
| 1:4 | $4 \times 10^{-2}$ | $2 \times 10^{-2}$ | $1 \times 10^{-1}$ | $2 \times 10^{-1}$ |
| 1:9 | $3 \times 10^{-2}$ | — | $1 \times 10^{-1}$ | $2 \times 10^{-1}$ |
| 1:20 | $9 \times 10^{-2}$ | $2 \times 10^{-1}$ | $9 \times 10^{-2}$ | $2 \times 10^{-1}$ |
| 1:1 N: total H Ratio | | | | |
| 1:1 | $5 \times 10^{-4}$ | $8 \times 10^{-4}$ | $3 \times 10^{-2}$ | — |
| 1:20 | $1 \times 10^{-1}$ | — | $1 \times 10^{-1}$ | — |

Films of composites of Engage™ 8100 polyolefin and the above-described complexes were prepared by dissolving a weighed amount of the Engage™ 8100 polyolefin in toluene (sonication for 2 hours), adding the proper amount of the above solution to bring the polyaniline complex additive level to the right value, sonicating again for about 30 minutes, and then evaporating the films at room temperature in a small evaporating dish. The conductivity of film was estimated by measuring surface resistance with a multimeter which has a maximum measurable resistance of $10^7$ ohms. The typical spacing between electrodes was about 1 cm.

Tables 10 and 11 show that polyaniline doped with EAA and DBSA can be used to prepare conducting polyethylene films at low additive levels when the ratios of EAA:DBSA, and the percent AA in the EAA are carefully chosen.

TABLE 10

EAA/DBSA/POLYANILINE COMPATIBILITY WITH
ENGAGE ™ 8100 POLYOLEFIN SURFACE
RESISTANCE OF SOLUTION CAST FILMS 5 WEIGHT
PERCENT LOADING OF POLYANILINE COMPLEX (Ohms)

| Ratio EAA:DBSA | 5 weight % acrylic acid in EAA | 10 weight % acrylic acid in EAA | 15 weight % acrylic acid in EAA | 20 weight % acrylic acid in EAA |
|---|---|---|---|---|
| 1N:1H (100% doped) | | | | |
| 1:0.2 | OL | OL | 520K | 400K |
| 1:0.5 | OL | OL | 930K | 600K |
| 1:1 | 10 M | OL | 900K | 2 M |
| 1:2 | 800K | OL | 500K | 185K |
| 1:3 | 2 M | OL | 76K | 200K |
| 1:4 | 5 M | OL | 1.4 M | 470K |
| 1:9 | 2 M | 2 M | 47K | 120K |
| 1:20 | 800K | 5 M | 1 M | 120K |
| 50% doped | | | | |
| 1:1 | OL | OL | 2 M | 11K |
| 1:20 | OL | 3 M | 43K | 14K |

OL = Overload ≈ > 20 Megaohms; M = $10^6$; K = $10^3$

TABLE 11

EAA/DBSA/POLYANILINE COMPATIBILITY WITH
ENGAGE ™ 8100 POLYOLEFIN-SURFACE
RESISTANCE OF SOLUTION CAST FILMS
2 PERCENT LOADING OF POLYANILINE COMPLEX
(VARIABLE POLYANILINE LOADING) (Ohms)

| Ratio EAA:DBSA | 5 weight % acrylic acid in EAA | 10 weight % acrylic acid in EAA | 15 weight % acrylic acid in EAA | 20 weight % acrylic acid in EAA |
|---|---|---|---|---|
| 1N:1H (100% doped) | | | | |
| 1:0.2 | — | — | OL | 5 M* |
| 1:0.5 | — | — | OL | 900K* |
| 1:1 | OL | — | OL | OL |
| 1:2 | OL | — | OL | OL |
| 1:3 | OL | — | 76K | OL |
| 1:4 | OL | — | OL | 300K* |
| 1:9 | 8 M | OL | 10 M | 100K* |
| 1:20 | 340K | 14 M | 830K | 10K* |
| 50% doped | | | | |
| 1:1 | — | — | 11 M | 50K* |
| 1:20 | — | 209K | 2 M | 10K* |

*Typically these bloom to one surface, other side not conductive.

EXAMPLE 4

Preparation of Polyaniline/Long-Chain Dopant Complex by Template-Guided Polymerization Into a 1 L round-bottomed beaker was added 33.3 g of a 30 weight percent aqueous solution of PSSA (polystyrene sulfonic acid, purchased from Aldrich Chemical Co.) and 10.0 g (0.11 mole) of aniline, which was allowed to mix for 1.5 hours under a nitrogen blanket. After 1.5 hours, more water was added to the solution (0.55 L of nanopure water), followed by slow addition of 45 mL of concentrated HCl, and then $FeCl_2$ salt (1.12 mmoles). After these additions, a slow addition of 15.0 g of a 35 weight percent aqueous solution of $H_2O_2$ was run over the course of 85 minutes. GC analysis for remaining aniline was run during this time.

After 360 minutes, the solution was removed from the reaction vessel. The solution was filtered through #3 filter paper in a course-fritted Buchner funnel. The solution filtered quickly and only one piece of filter paper was used. The solution was then run through an ion-exchange column containing Amberlite IR-120 ion exchange resin to remove the $Fe^{2+}/Fe^{3+}$.

The above solution was then run through an ion-exchange column which contained anionic ion-exchange resin ($HCO_3^-$) in an 8:1 mole ratio with the amount of HCl present (400 mL of solution per 314 g resin). This removed the excess HCl added to the solution for the polymerization. The aqueous solution was then washed four times with 1-pentanol by placing about 200 mL of the solution in a separatory funnel with about 300 mL of 1-pentanol. The solution was then concentrated by evaporation at about 70° C. under reduced pressure (rotovap). The solid content was evaluated by weighing out a known amount of solution, evaporating to dryness at 100° C., and then weighing the residue.

Addition of Short-Chain Dopant

The solid obtained above was 50 weight percent polyaniline in the polyaniline/PSSA complex. The short-chain acid described in Table 12 was added as either a solid or in solution to an aqueous solution of the PSSA/polyaniline complex and then mixed with a stir bar, or sonicated for at least 24 hours. This time was used for diffusion of the small chain into the PSSA/polyaniline complex. The percentages of short-chain acid dopant shown in the table was based on the molar amount of aniline present in the polyaniline/PSSA complex. The conductivity of the complexes was measured as in Example 2 and is reported in Table 12. The room-temperature conductivity was measured initially and also after two of the complexes were heated to the temperatures shown in Table 12 for 1 hour, and then cooled back down to room temperature, as shown in Table 12.

TABLE 12

| Sample | Long-Chain Dopant and MW | Short-Chain Dopant and mole % based on amount of polyaniline | Initial Room Temperature Conductivity (S/cm) | Conductivity at Room Temperature after 1 hr @ 225° C. (S/cm) | Conductivity at Room Temperature after 1 hr @ 250° C. (S/cm) |
|---|---|---|---|---|---|
| Comp. Ex. 1* | PSSA 40,000 | none | $3.3 \times 10^2$ | $0.1 \times 10^{-2}$ | — |

TABLE 12-continued

| Sample | Long-Chain Dopant and MW | Short-Chain Dopant and mole % based on amount of polyaniline | Initial Room Temperature Conductivity (S/cm) | Conductivity at Room Temperature after 1 hr @ 225° C. (S/cm) | Conductivity at Room Temperature after 1 hr @ 250° C. (S/cm) |
|---|---|---|---|---|---|
| 4a | PSSA 40,000 | 50% HBSA doped | $2.9 \times 10^{-2}$ | $11 \times 10^{-2}$ | $1.1 \times 10^{-2}$ |
| 4b | PSSA 40,000 | 40% HBSA doped | $2.8 \times 10^{2}$ | $22 \times 10^{-2}$ | — |

HBSA = Hydroxybenzene sulfonic acid
*Comparative Example - not an example of the invention

EXAMPLE 5
Addition of Short-Chain dopant to a Long-Chain doped Polythiophene Complex A solution of Trial Product A1 4071 polythiophene was obtained from the Bayer Corporation. This was an aqueous solution of PEDT/PSS (a polystyrene sulfonic acid doped polyethylene dioxythiophene—PSS was the long-chain dopant). A portion of the solution was poured into an evaporating dish, and the solvent evaporated overnight in a chemical hood to yield the solid product, which was dark blue.

Several formulations were prepared of PEDT/PSS with the short-chain dopants which were either HBSA (Hydroxybenzene sulfonic acid) or $FeCl_3$. For each formulation, 0.025 grams of solid PEDT/PSS (0.07 mmole) were first redissolved in aliquots of about 30 mL of water. For sample U, 0.90 grams of a 6.5 weight percent HBSA solution (0.035 mmoles) was added to the PEDT/PSS solution and allowed to mix by sonication for 24 hours. For another sample, 0.055 grams of $FeCl_3$ (0.035 mmoles) was added to the PEDT/PSS aliquot. For this sample, addition of $FeCl_3$ resulted in rapid precipitation of a blue complex. This solid was collected but was found to be insoluble in the following solvents: acetone, methanol, isopropyl alcohol, ethanol, mixtures of about 15 percent NMP with these solvents, and 100 percent NMP.

A portion of Sample U solution was poured into a small evaporating dish, and the solid collected the next day. The product was a blue film having a color which was very similar to the original material having no additional HBSA (Sample T). Razor blade probes placed about 1 cm apart and lightly pressed into the surfaces showed only 800 ohms resistance for the HBSA modified material, while the resistance of the unmodified films showed about 55,000 ohms. The HBSA modified PEDTIPSS complex was no longer soluble in water, while the unmodified material readily dissolved in water.

In order to more carefully compare conductivity of the HBSA modified and unmodified samples, more films were prepared and analyzed optically as well as electrically. These results are shown in Table 13. Sample T had no additional HBSA, U had the amount described above, and V had one half the amount of HBSA described for sample U. Sample V was also sonicated for 24 hours before film preparation.

TABLE 13

Spectroscopic and Electronic Evaluation of HBSA doped PEDT/PSS

| Sample ID | Amount HBSA added | Optical Density* at the following wavelengths: | | | | | film length (cm) | film Width (cm) | Resistance (ohms) |
|---|---|---|---|---|---|---|---|---|---|
| | | 300 nm | 500 nm | 800 nm | 1200 nm | 1500 nm | | | |
| T | none | 0.39 | 0.31 | 0.69 | 1.15 | 1.81 | 2 | 0.8 | 1,063,000 |
| U | 100% doped | 0.24 | 0.22 | 0.47 | 0.75 | 1.20 | 1.7 | 0.7 | 1352 |
| V | 50% doped | 0.93 | 0.4G | 0.92 | 1.39 | 2.21 | 1.6 | 0.7 | 379,000 |

*The measurements for optical density were taken on a Lambda-9 spectrophotometer which was controlled by a Perkin Elmer - 7700 microcomputer.

The data in Table 13 shows that the concept of long-chain/short-chain doping was effective for ICPs other than polyaniline, this specific example being a polythiophene derivative.

What is claimed is:

1. A conductive polymer composition having a conductivity of at least about $10^{-12}$ Siemens/cm (S/cm) and comprising an intrinsically-conductive polymer which is doped with at least two different dopants, including a first dopant having a molecular weight of less than about 1,000 and a second dopant which is polymeric and has a weight average molecular weight of greater than about 2,000, wherein the first dopant is dodecylbenzenesulfonic acid, para-toluenesulfonic acid or hydroxybenzenesulfonic acid, and wherein the first dopant is present in an amount sufficient to increase the conductivity of the composition, relative to the conductivity of a composition, which is the same in all respects, except that the intrinsically-conductive polymer has the same molar amount of available sites doped solely with the second dopant.

2. The composition of claim 1 wherein the an intrinsically-conductive polymer is a poythiophene.

3. The composition of claim 2 wherein the intrinsically-conductive polymer is polyethylene dioxythiophene, and the second dopant is polystyrene sulfonic acid.

4. The composition of claim 1 wherein the second dopant is selected from ethylene/acrylic acid copolymers, polyacrylic acids, ethylene/methacrylic acid copolymers, carboxylic acid- or sulfonic acid-functional polystyrene, graft copolymers of polyethylene or polypropylene and acrylic acid or maleic anhydride or mixtures thereof, sulfonated ethylene-styrene copolymers, and polyvinylsulfonic acid.

5. A solution or stable dispersion of 0.01 to 95 percent by weight of the doped intrinsically-conductive polymer of claim 1 in a thermosetting resin, selected from the group consisting of polyepoxides and polyurethanes.

6. The solution or stable dispersion of claim 5 wherein the intrinsically-conductive polymer is polyaniline and is doped with the second dopant by a process comprising the steps of: (i) complexing aniline monomers to the second dopant to provide a molar ratio of reactive sites of the aniline:dopant of no greater than 1: 1; and (ii) adding an oxidant thereto and polymerizing the monomers under conditions sufficient to form polyaniline.

7. The composition of claim 1 wherein the second dopant is polystyrene sulfonic acid having a molecular weight no greater than 40,000.

8. A compatible mixture of: (a) at least one matrix material selected from thermoplastic polymers, thermosetting polymers, latexes, and sol gels and (b) a doped intrinsily-conductive polymer having a higher electronic conductivity than (a), wherein:

(i) the doped intrinsically-conductive polymer is doped with at least two different dopants, including a first dopant having a molecular weight of less than 1,000 and being selected from dedecylbenzenesulfonic acid and para-toluenesulfonic acid, and a second dopant which is polymeric and has a weight average molecular weight of greater than 2,000;

(ii) at least 1 percent of the polymer's available sites are doped with each dopant; and (iii) the composition has a conductivity of at least about $10^{-12}$ Siemens/cm (S/cm).

9. An aqueous dispersions of a doped intrinsically conductive polymer which is doped with at least two dopants, including a first dopant selected from dodecylbenzenesulfonic acid and para-toluenesulfonic acid, and a second dopant having a higher molecular weight than the first dopant, wherein (a) at least 1 percent of the polymer's available sites are doped with each dopant; and (b) the doped polymer has a conductivity of at least about 10–12 Siemens/cm (S/cm).

* * * * *